(12) United States Patent
Zhang

(10) Patent No.: US 11,064,098 B2
(45) Date of Patent: Jul. 13, 2021

(54) CAMERA MODULE, CAMERA ASSEMBLY AND ELECTRONIC DEVICE

(71) Applicant: GUANGDONG OPPO MOBILE TELECOMMUNICATIONS CORP., LTD., Guangdong (CN)

(72) Inventor: Gong Zhang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 167 days.

(21) Appl. No.: 16/437,460

(22) Filed: Jun. 11, 2019

(65) Prior Publication Data

US 2019/0387140 A1  Dec. 19, 2019

(30) Foreign Application Priority Data

Jun. 15, 2018 (CN) .......................... 201810618818.8
Jun. 15, 2018 (CN) .......................... 201820939298.6

(51) Int. Cl.
*H04N 5/225* (2006.01)
*G06F 1/16* (2006.01)

(52) U.S. Cl.
CPC ......... *H04N 5/2253* (2013.01); *G06F 1/1605* (2013.01); *H04N 5/2252* (2013.01); *H04N 5/2254* (2013.01)

(58) Field of Classification Search
CPC .. H04N 5/2253; H04N 5/2252; H04N 5/2254; G06F 1/1605
See application file for complete search history.

(56) References Cited

U.S. PATENT DOCUMENTS

2008/0225139 A1   9/2008 Nomura et al.
2011/0190749 A1*  8/2011 McMillan ............... A61N 5/06
                                                        606/16
(Continued)

FOREIGN PATENT DOCUMENTS

CN    104980542 A    10/2015
CN    206039030 U     3/2017
(Continued)

OTHER PUBLICATIONS

SIPO, Second Office Action for CN Application No. 201810618818.8, dated Jan. 6, 2020.
(Continued)

*Primary Examiner* — Sinh Tran
*Assistant Examiner* — Zhenzhen Wu
(74) *Attorney, Agent, or Firm* — Hodgson Russ LLP

(57) ABSTRACT

A camera module, a camera assembly, and an electronic device are provided. The camera module include a casing having a light inlet, a prismatic reflector disposed in the casing and aligning with the light inlet, and an image sensor disposed in the casing. The prismatic reflector is configured to reflect an incident light from the light inlet to the image sensor, thereby the image sensor is capable of capturing images. The prismatic reflector includes a light-incident surface facing the light inlet, an opposite surface oppositely to the light-incident surface, a reflective face coupled to the light-incident surface and the opposite surface, and a light-emitting surface coupled to the light-incident surface and the opposite surface. The reflective face is inclined with respect to the light-incident surface. The light-emitting surface is opposite to the reflective surface.

20 Claims, 10 Drawing Sheets

(56) References Cited

U.S. PATENT DOCUMENTS

| | | | |
|---|---|---|---|
| 2011/0267692 A1 | 11/2011 | Watanabe et al. | |
| 2013/0021485 A1 | 1/2013 | Hsu | |
| 2013/0077215 A1* | 3/2013 | Tada | G06K 9/00006 |
| | | | 361/679.01 |
| 2013/0278785 A1* | 10/2013 | Nomura | G02B 7/102 |
| | | | 348/208.11 |
| 2015/0281530 A1* | 10/2015 | Kessler | H04N 5/2254 |
| | | | 348/373 |
| 2015/0334859 A1* | 11/2015 | Lee | H05K 5/0217 |
| | | | 361/749 |
| 2018/0024329 A1* | 1/2018 | Goldenberg | G02B 7/09 |
| | | | 359/557 |

FOREIGN PATENT DOCUMENTS

| | | |
|---|---|---|
| CN | 107490845 A | 12/2017 |
| CN | 206993252 | 2/2018 |
| CN | 107786781 | 3/2018 |
| CN | 207124681 U | 3/2018 |
| CN | 108551546 | 9/2018 |
| CN | 208461917 | 2/2019 |
| WO | 2016166730 | 10/2016 |

OTHER PUBLICATIONS

SIPO, Decision of Rejection for CN Application No. 201810618818.8, dated Apr. 30, 2020.
WIPO, English Translation of ISR/WO for PCT/CN2019/091021, dated Sep. 11, 2019.
EPO, Office Action for EP Application No. 19180105.9, dated Nov. 19, 2019.
CNIPA, Office Action in Chinese Appl. No. 201810618818.8, dated Jun. 5, 2019.
IPI, Examination Report for IN Application No. 201914023681, dated Dec. 22, 2020.

* cited by examiner

CAMERA MODULE, CAMERA ASSEMBLY AND ELECTRONIC DEVICE

CROSS-REFERENCE TO RELATED APPLICATION

This application claims priority to Chinese Patent Application No. 201820939298.6, filed Jun. 15, 2018, and Chinese Patent Application No. 201810618818.8, filed Jun. 15, 2018. The entire disclosures of the aforementioned applications are incorporated herein by reference.

TECHNICAL FIELD

The present disclosure relates to the field of consumer electronics in general. More particularly, and without limitation, the disclosed embodiments relate to a camera module, a camera assembly and an electronic device.

BACKGROUND

Nowadays, in order to improve an imaging effect of a mobile phone, a camera having zooming function can be applied in the mobile phone. The camera can capture a quality image by zooming. The camera having zooming function may have a large size in a direction of an optical axis thereof. The camera may be disposed in the mobile phone by arranging the optical axis parallel with a thickness direction of the mobile phone.

However, because of a limitation of the thickness of the mobile phone, a focal length of the camera may not be zoomed in a desire range when the camera zooms.

SUMMARY

The present disclosure provides a camera module, a camera assembly and an electronic device.

In accordance with an embodiment of the present disclosure, the camera module a casing having a light inlet, a prismatic reflector disposed in the casing and aligning with the light inlet, and an image sensor disposed in the casing. The prismatic reflector being configured to reflect an incident light from the light inlet to the image sensor, thereby the image sensor being capable of capturing images. The prismatic reflector includes a light-incident surface facing the light inlet, an opposite surface opposite to the light-incident surface, a reflective face coupled to the light-incident surface and the opposite surface, and a light-emitting surface coupled to the light-incident surface and the opposite surface. The reflective face is inclined with respect to the light-incident surface. The light-emitting surface is opposite to the light-incident surface.

In accordance with another embodiment of the present disclosure, the camera assembly includes a decorative member defining a through hole therein, and a camera module coupled to the decorative member. The camera module a casing having a light inlet, a prismatic reflector disposed in the casing and aligning with the light inlet, and an image sensor disposed in the casing. The prismatic reflector being configured to reflect an incident light from the light inlet to the image sensor, thereby the image sensor being capable of capturing images. The prismatic reflector includes a light-incident surface facing the light inlet, an opposite surface opposite to the light-incident surface, a reflective face coupled to the light-incident surface and the opposite surface, and a light-emitting surface coupled to the light-incident surface and the opposite surface. The reflective face is inclined with respect to the light-incident surface. The light-emitting surface is opposite to the reflective surface.

In accordance with still another embodiment of the present disclosure, the electronic device includes a housing defining a light-transmitting portion and a camera assembly disposed in the housing. The camera module a casing having a light inlet, a prismatic reflector disposed in the casing and aligning with the light inlet, and an image sensor disposed in the casing. The prismatic reflector being configured to reflect an incident light from the light inlet to the image sensor, thereby the image sensor being capable of capturing images. The prismatic reflector includes a light-incident surface facing the light inlet, an opposite surface opposite to the light-incident surface, a reflective face coupled to the light-incident surface and the opposite surface, and a light-emitting surface coupled to the light-incident surface and the opposite surface. The reflective face is inclined with respect to the light-incident surface. The light-emitting surface is opposite to the reflective surface.

BRIEF DESCRIPTION OF THE DRAWINGS

The accompanying drawings, which are incorporated in and constitute a part of this specification, illustrate exemplary embodiments of the present disclosure, and together with the description, serve to explain the principles of the disclosure.

DETAILED DESCRIPTION OF EMBODIMENTS

Figure 1:
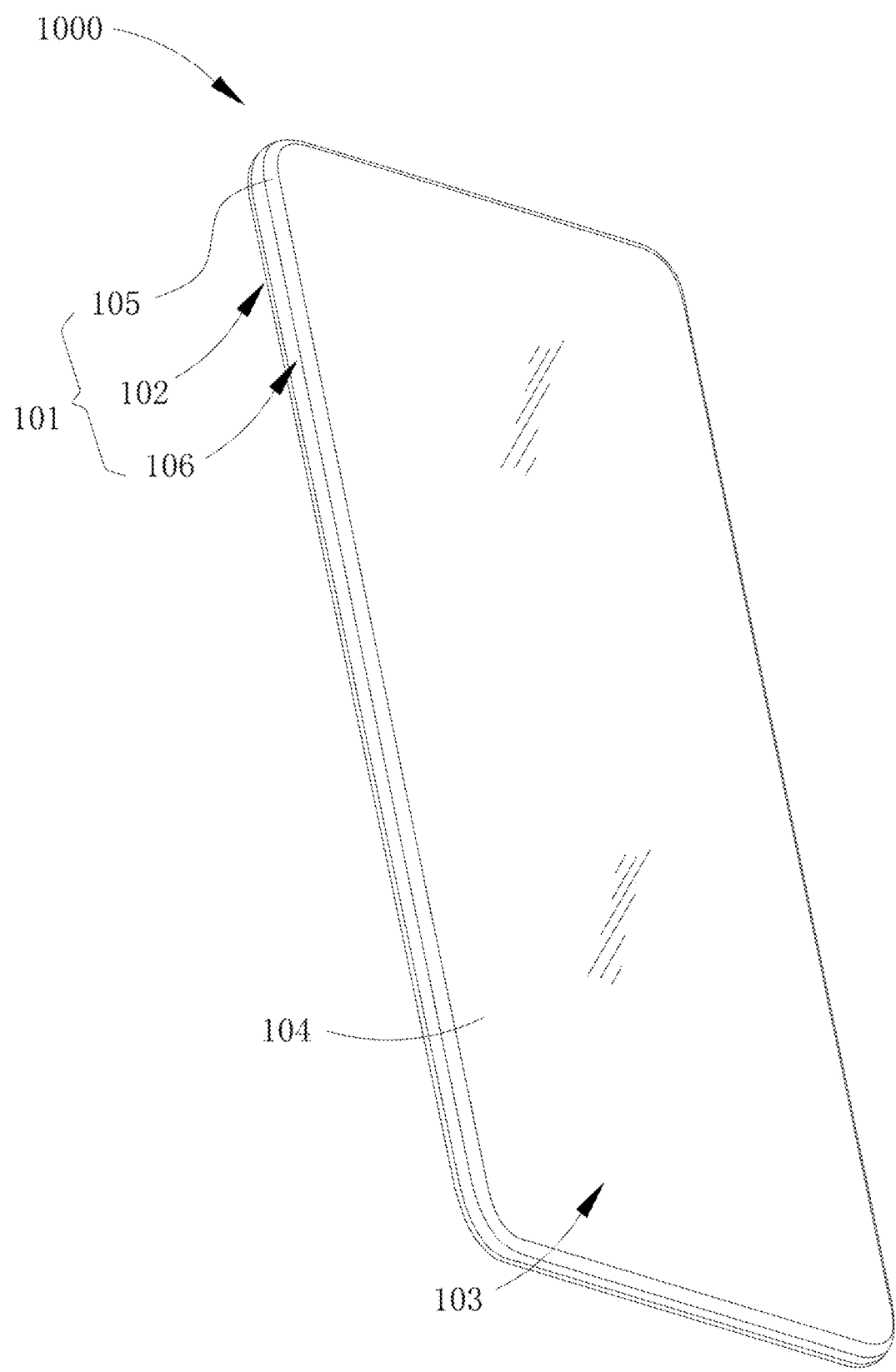
FIG. 1 illustrates a schematic perspective view of an electronic device, in accordance with an embodiment of the present disclosure.

This description and the accompanying drawings that illustrate exemplary embodiments should not be taken as limiting. Various mechanical, structural, electrical, and operational changes may be made without departing from the scope of this description and the claims, including equivalents. In some instances, well known structures and techniques have not been shown or described in detail so as not to obscure the disclosure. Similar reference numbers in two or more figures represent the same or similar elements. Furthermore, elements and their associated features that are disclosed in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

In the description of the present disclosure, it is to be understood that the words "center", "longitudinal", "transverse", "length", "width", "thickness", "upper", "lower", "front", "behind", "left", "right", "vertical", "horizontal", "top", "bottom", "inside", "outside", "clockwise", "counter-clockwise", etc., which directly indicates positional relationships, are base d on the orientation or positional relationship according to the drawings, and are merely for the convenience of describing the present disclosure and the simplified description, and do not indicate or imply that the device, element or component should be referred to has a specific orientation, or be constructed or operated in a specific orientation. Therefore, the words are not to be construed as limiting the present disclosure. Moreover, the terms "first" and "second" are used for descriptive purposes only and are not to be construed as indicating or implying a relative importance or implicitly indicating the number of technical features indicated. Thus, features defining "first" or "second" may include one or more of the described features either explicitly or implicitly. In the description of the present disclosure, the meaning of "a plurality" is two or more unless furthermore and furthermore defined otherwise.

In the description of the present disclosure, it should be noted that the terms "installation", "connected", and "connected" are to be understood broadly, and may be, for example, a fixed connection or a movable connection, or integrally connection, and may be mechanical, electrical or communication, and may be directly connected or indirectly connected through an intermediate medium, and may be internal communication of two components or mutual interaction of two components. For those skilled in the art, the specific meanings of the above terms in the present disclosure can be understood on a case-by-case basis.

In the present disclosure, when a first feature is described as being disposed "on" or "under" a second feature, it means that, the first feature may directly contact with the second feature, or may indirectly contact with the second feature via a third feature disposed between the first and the second features. Moreover, when the first feature is described as being "on", "above" and "over" the second feature, it means that, the first feature may be directly arranged over the second feature and aligned with or ramp above the second feature, or may mealy be arranged on a location having a height larger than that of the second feature. When the first feature is described as being "below", "under" and "beneath" the second feature, it means that, the first feature may be directly arranged under the second feature and aligned with or ramp under the second feature, or may mealy be arranged on a location having a height smaller than that of the second feature.

The following disclosure provides many different embodiments or examples for implementing different structures of the present disclosure. In order to simplify description of the present disclosure, the components and arrangements of the specific examples are described below. Alternatively, they are merely examples and are not intended to limit the present disclosure. In addition, the present disclosure may be repeated with reference to the numerals and/or reference numerals in various examples, which are for the purpose of simplicity and clarity, and do not indicate the relationship between the various embodiments and/or arrangements discussed. Moreover, the present disclosure provides examples of various specific processes and materials, but one of ordinary skill in the art will recognize the use of other processes and/or the use of other materials.

As illustrated in FIG. 1, an electronic device 1000 is provided, in accordance with an embodiment of the present disclosure. The electronic device 1000 may be any device with communication function and storage function, such as: a tablet, a mobile phone, a tablet computer, a notebook computer, a smart bracelet, a smart watch, a smart helmet, a smart glasses, a network television, or other smart device with network capabilities. The electronic device 1000 of the illustrating embodiment will be described by taking a mobile phone as an example. In an alternative embodiment, the electronic device 1000 may be other form of device, which is not limited herein.

Figure 2:
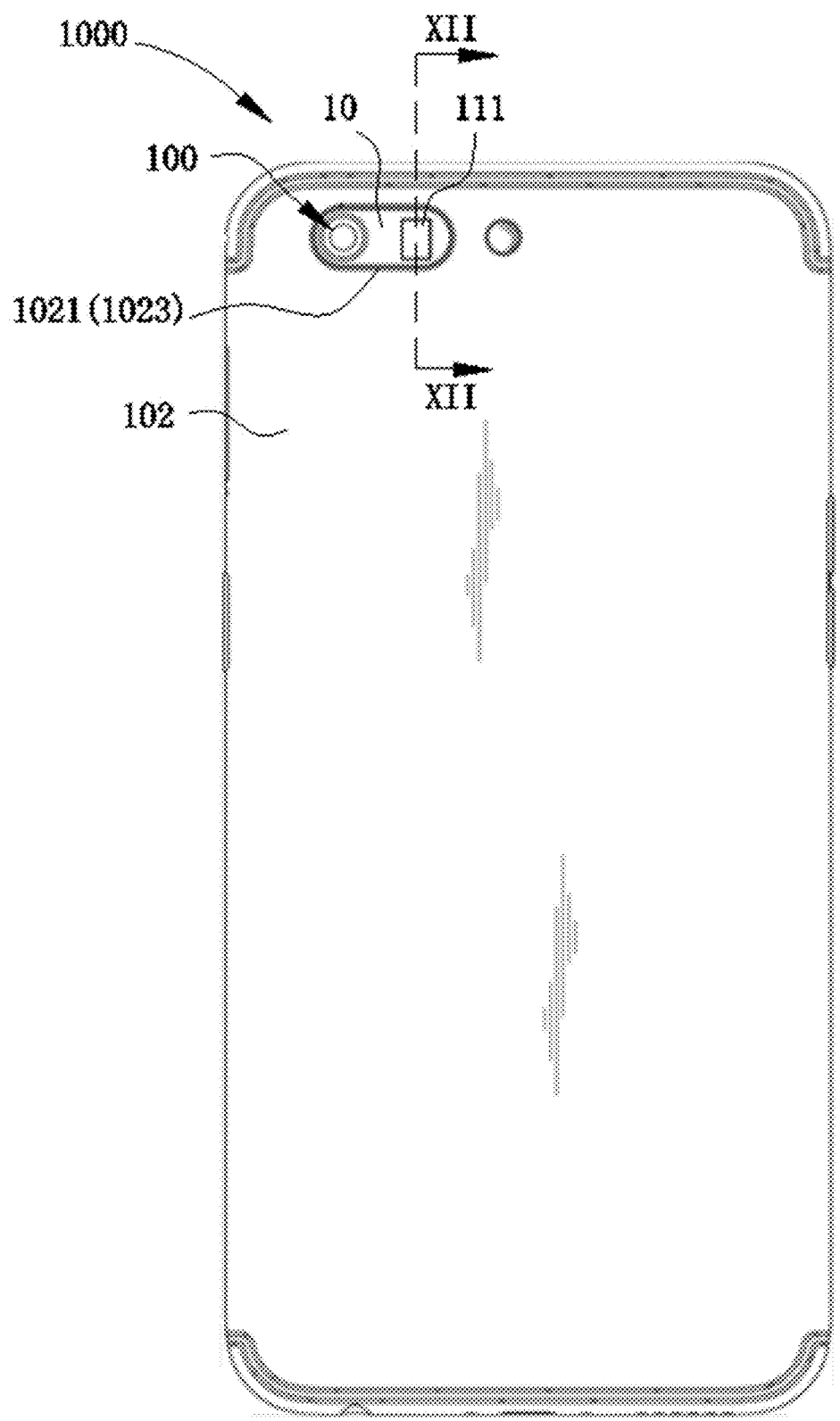
FIG. 2 illustrates a schematic projection view of the electronic device of FIG. 1.

As illustrated in FIGS. 1 to 2, the electronic device 1000 includes a housing 101 and an electronic component 103. The electronic component 103 includes a display module 104, a camera assembly 100, and a plurality of electronic elements (not illustrated). The display module 104 and the camera assembly 100 is coupled to the housing 101. The electronic elements are received in the housing 101.

In some embodiment, the housing 101 may be an external component of the electronic device 1000 that configured to protect internal components of the electronic device 1000. For example, the housing 101 is configured to support the display module 104 and to receive electronic elements of the electronic device 1000. In the embodiment illustrated in FIG. 1 and FIG. 2, the housing 101 includes a front cover 105, a rear cover 102, and a frame 106. The frame 106 is disposed between and coupled to the front cover 105 and the rear cover 102. The display module 104 is coupled to one side of the frame 106, and the rear cover 102 is coupled to an opposite side of the frame 106. In some embodiment, the frame 106 of the electronic device 1000 may be combined with the front cover 105 by molding. In another embodiment, the frame 106 may be combined with the rear cover 102 by molding. In still another embodiment, the frame 106 may be an independent member and assembled to the rear cover 102 and the front cover 105.

The rear cover 102 may be a battery cover of the electronic device 1000 that configured to cover components such as batteries of the electronic device 1000. In the illustrating embodiment, the camera assembly 100 is a back camera of the electronic device 1000. In other words, a light entrance of the camera assembly 100 is exposed from the rear cover 102 when the camera assembly 100 is received in the housing 101. Such that the electronic device 1000 can capture images of sights behind the electronic device 1000.

As illustrated in FIG. 2, the rear cover 102 is substantially rectangular. The camera assembly 100 is disposed at an upper left corner of the rear cover 102. It can be noted that, the words of locality such as "left" and "right" used herein are referred in a perspective of a reader of the drawing. Alternatively, in other embodiments, the camera assembly 100 can also be disposed at other positions such as the upper middle portion or the upper right corner of the rear cover 102. The position at which the camera assembly 100 is disposed at the rear cover 102 is not limited to the examples of the present disclosure. In other embodiments, the camera assembly 100 may be a front camera of the electronic device 1000, and the light entrance of the camera assembly 100 is exposed from the front cover 102 of the electronic device 1000 when the camera assembly 100 is received in the housing 101.

The rear cover 102 may define a mounting hole 1021 therein. The mounting hole 1021 is configured to partially receive the camera assembly 100, and allow the camera assembly to be exposed.

Figure 3:
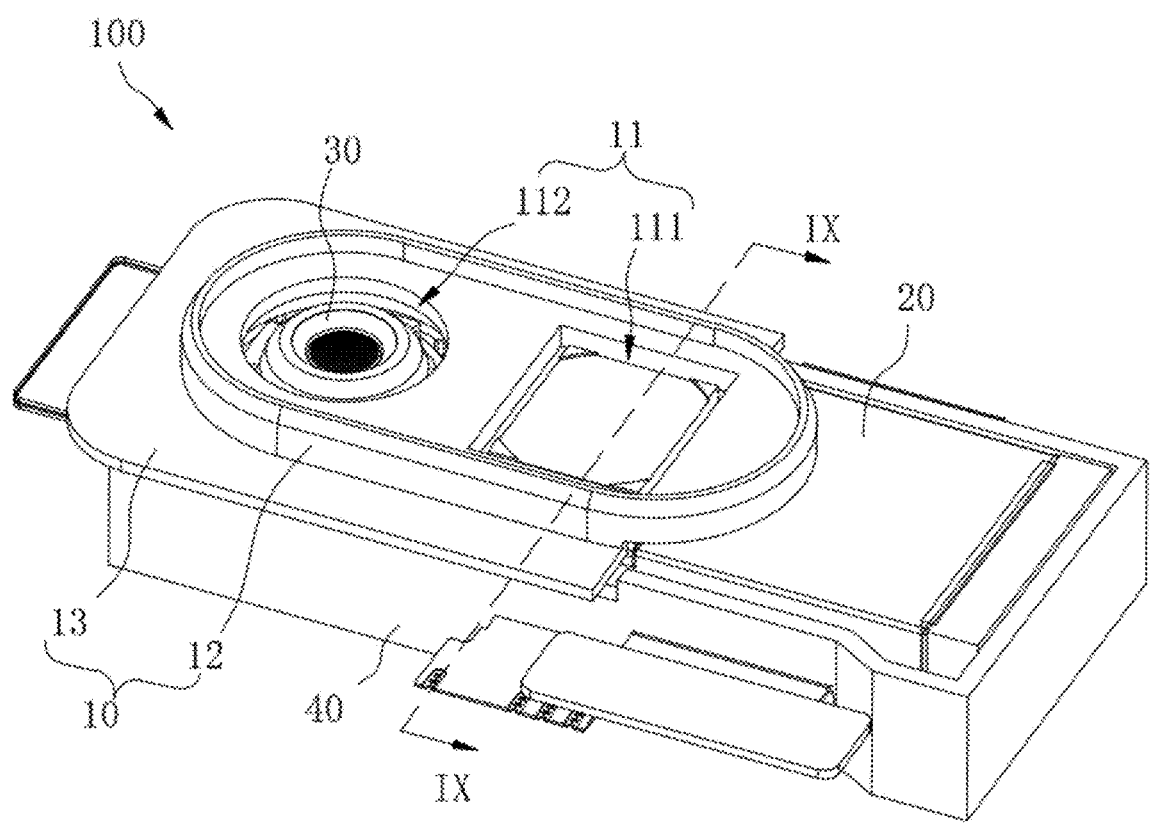
FIG. 3 illustrates a perspective view of a camera assembly of the electronic device of FIG. 2.

As illustrated in FIG. 3, the camera assembly 100 includes a decorative member 10, a first camera module 20, a second camera module 30, and a support 40.

Figure 4:
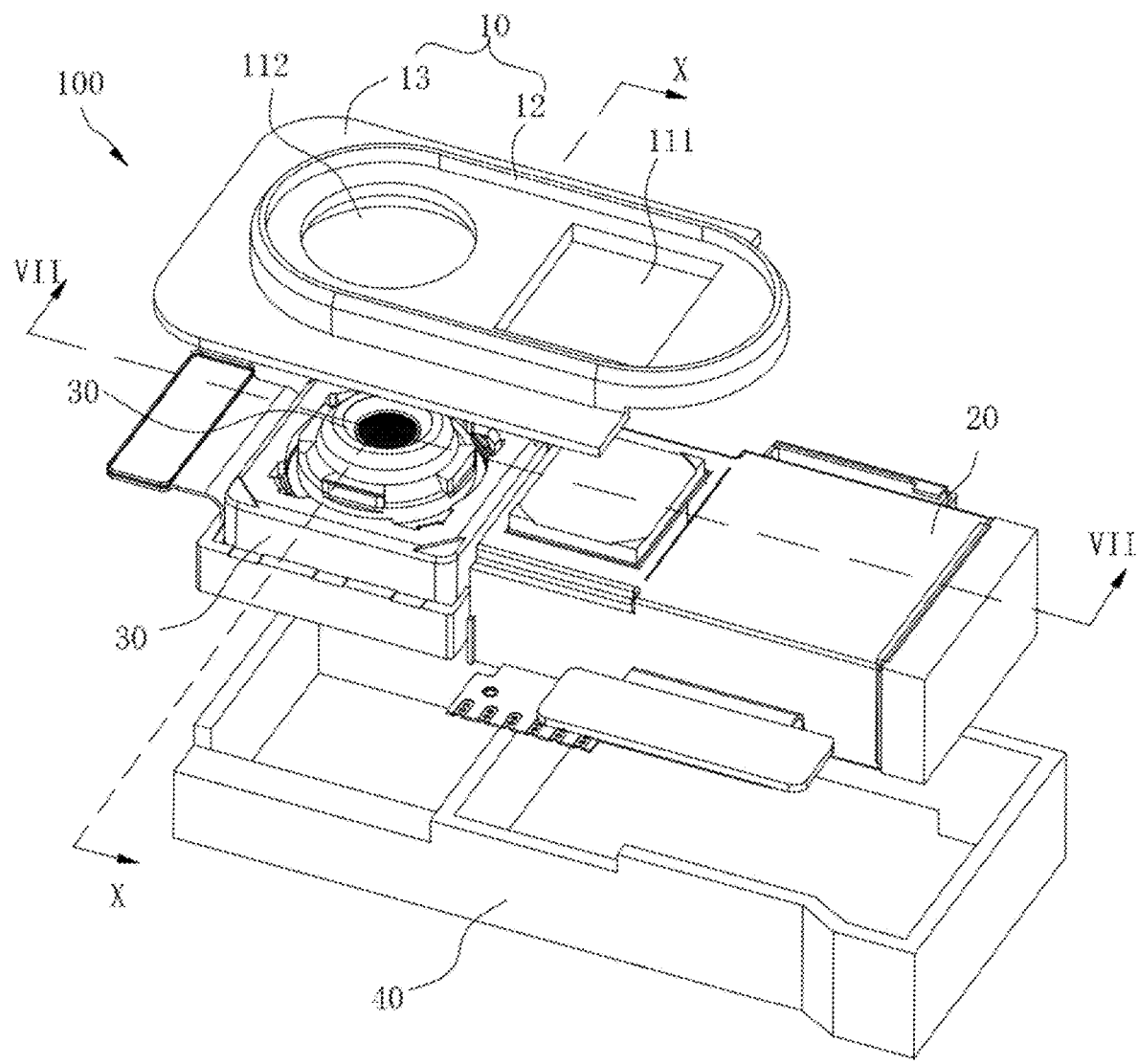
FIG. 4 illustrates an exploded perspective view of the camera assembly of FIG. 3.

As illustrated in FIG. 4, the support 40 is substantially a rectangular frame. The support 40 is disposed in the housing 101 corresponding to the mounting hole 1021. The first camera module 20 and the second camera module 30 are both disposed in the support 40 and fixed to the support 40. The decorative member 10 is disposed on the first camera module 20 and the second camera module 30, and the decorative member 10 is inserted into the mounting hole 1021. Thereby the first camera module 20 and the second camera module 30 can be exposed from the decorative member 10 and the mounting hole 1021. The decorative member 10 may abut against the support 40 or may be spaced apart from the support 10. The support 40 is configured to act as a buffer to reduce an impact occurs to the first camera module 20 and the second camera module 30, such that a service life of the first camera module 20 and the second camera module 30 can be extended.

In some embodiments, the housing 101 is provided without the mounting hole 1021, and the housing 102 can define a light-transmitting portion 1023 (see in FIG. 1), the light-transmitting portion 1023 is configured to form a light entrance in the housing 102, and the first camera module 20 and the second camera module 30 can face the light-transmitting portion 1023. The light-transmitting portion 1023 can be hollow or transparent, or can be made of a light-transmitting material such as glass, resin, and plastic. In some embodiments, the light-transmitting portion 1023 can be coated by a film that allows infrared light to penetrate and reflects visible light. And at least one of the first camera module 20 and the second camera module 30 can be an infrared camera module.

The decorative member 10 can be made of a metal material. For example, the decorative member 10 is made of stainless steel. The decorative member 10 can be treated by a polishing process to form a shiny surface. Such that an apparent of the decorative member 10 may be more beautiful.

As illustrated in FIG. 4, the decorative member 10 defines through holes 11. The through holes 11 are configured to expose the first camera module 20 and the second camera module 30. Thereby, the first camera module 20 and the second camera module 30 can capture images through the through holes 11. In the illustrating embodiment, the through holes 11 includes a first through hole 111 and a second through hole 112. The first through hole 111 and the second through hole 112 are spaced apart from each other. In other words, the first through hole 111 and the second through hole 112 are not communicate with each other. Alternatively, in other embodiments, the first through hole 111 and the second through hole 112 may communicate with each other and cooperatively define an integral hole in the decorative member 10. The first camera module 20 can be aligned to the first through hole 111, and capture images through the first through hole 111. The second camera module 30 can be aligned to the second through hole 112, and capture images through the second through hole 112. In the illustrating embodiment, the first through hole 111 is substantially a circular hole, and the second through hole 112 is substantially a square hole.

In other alternative embodiments, shapes of the first through hole 111 and the second through hole 112 are not limited to the shapes in the drawings. For example, the first through hole 111 and the second through hole 112 may be both circular holes, or the first through hole 111 and the second through hole 112 may be both square holes.

Figure 5:
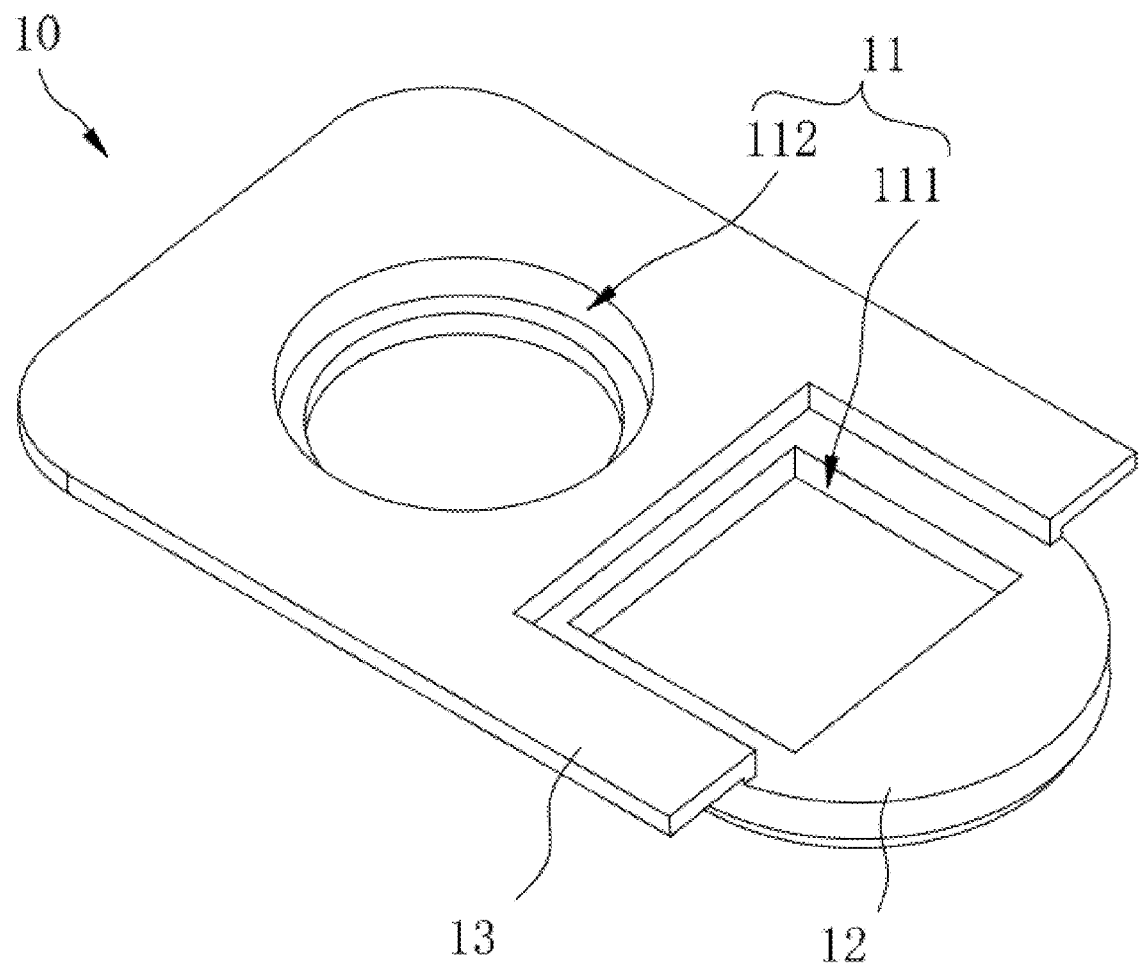
FIG. 5 illustrates a perspective view of a decorative member of the camera assembly of FIG. 4, taken from an opposite perspective.

As illustrated in FIG. 5, the decorative member 10 includes a decorative bezel 12 and a support portion 13 coupled to the decorative bezel 12.

Figure 12:
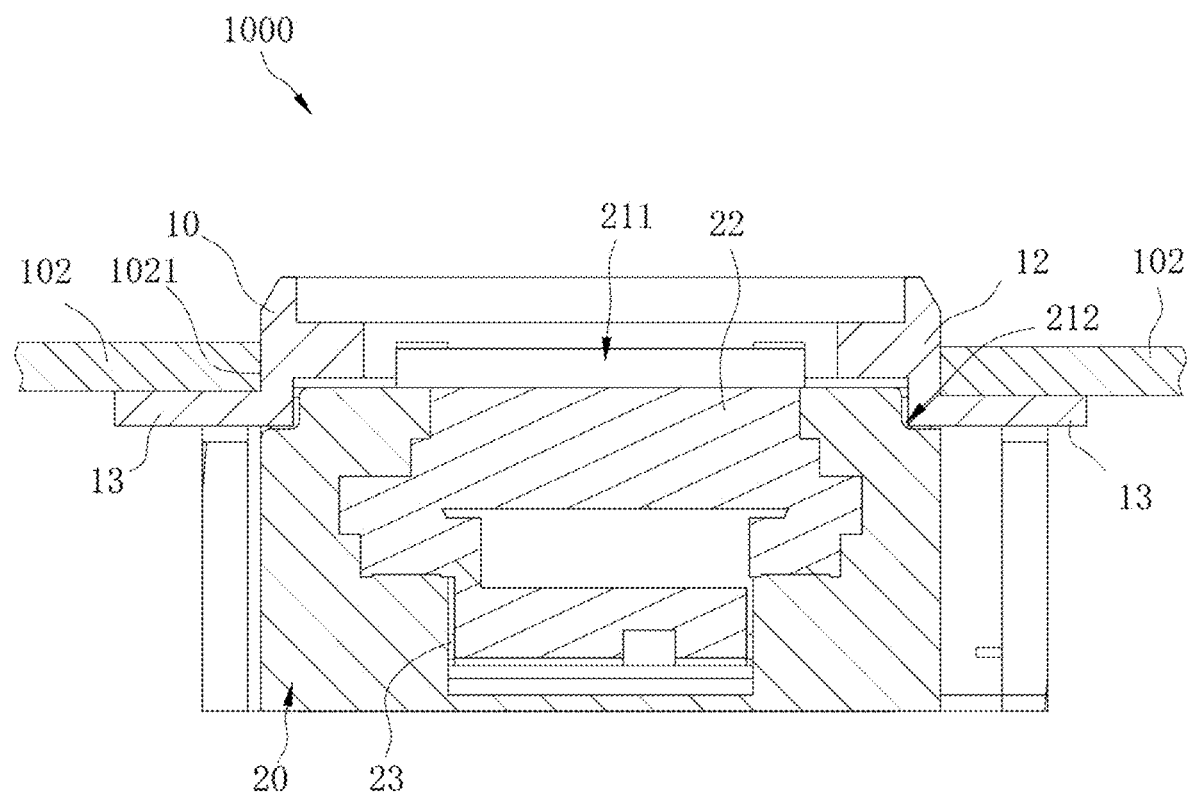
FIG. 12 illustrates a broken-out cross-sectional view of the electronic device of FIG. 2, taken along a line XII-XII.

The support portion 13 is stacked on the first camera module 20 and the second camera module 30. The decorative bezel 12 is disposed on a side of the support portion 13 away from the first camera module 20 and the second camera module 30. Edges of the support portion 13 protrude from edges of the decorative bezel 12 and extend in a direction away from the decorative bezel 12. The through holes 11 are defined in the decorative bezel 12 and passes through the decorative bezel 12 and the support portion 13. When the decorative member 10 is mounted to the rear cover 102, the support portion 13 abuts against an interior surface of the rear cover 102 while the decorative bezel 12 is inserted into the mounting hole 1021, as illustrated in FIG. 12. By this way, a mounting position of the decorative member 10 can be limited by the rear cover 102, and the decorative member 10 is prevented from detaching from the rear cover 102. In some embodiment, when mounting the decorative member 10 to the rear cover 102, the decorative member 10 may penetrate outwardly from an interior of the rear cover 102, and is engaged into the mounting hole 1021. When the support portion 13 abuts against the interior surface of the rear cover 102, the decorative member 10 is considered to be mounted to a predetermined position. The decorative member 10 can be fixed to the rear cover 102 via an adhesive, or the decorative member 10 can be interference-fitted with the rear cover 102, so that the decorative member 10 is prevented from detaching from the rear cover 102.

The decorative member 10 may be an integrated structure formed by the decorative bezel 12 and the support portion 13. For example, the decorative member 10 is formed by cutting. In an alternative embodiment, the decorative bezel 12 and the support portion 13 may be produced as two components to cooperatively form the decorative member 10. For example, the decorative bezel 12 and the support portion 13 may be produced separately and independently, and separated decorative bezel 12 and the support portion 13 may be assembled together to form the decorative member 10. The separate decorative bezel 12 and the support portion 13 may be coupled to each other by welding.

It should be noted that, in other alternative embodiments, the support portion 13 may be omitted. For example, in an alternative embodiment, the decorative member 10 may just include the decorative bezel 12.

The first camera module 20 and the second camera module 30 are arranged side by side. The second camera module 30 is disposed at a side of the first camera module 20. In the illustrating embodiment, the first camera module 20 and the second camera module 30 are arranged in an "I" shaped. In other words, the first camera module 20 and the second camera module 30 are arranged adjacent with each other in a straight line. In details, a longitudinal direction of the first camera module 20 may be substantially parallel to or coincided with that of the second camera module 30. In other embodiments, the first camera module 20 and the second camera module 30 may be arranged in an L shape. In details, the longitudinal direction of the first camera module 20 may be substantially perpendicular to or inclined with respect to that of the second camera module 30. In till other embodiments, the first camera module 20 and the second camera module 30 may be spaced apart or may be abutted against each other.

In the illustrating embodiment of FIG. 3, the first camera module 20 is located at a right side of the second camera module 30. In other words, the first camera module 20 is closer to a central portion of the electronic device 1000 than the second camera module 30 when the camera assembly 100 is disposed at an upper left corner of the rear cover 102. It can be noted that, the words of locality such as "left" and "right" used herein are referred in a perspective of a reader. In other alternative embodiments, a location of the first camera module 20 and a location the second camera module 30 may be interchanged. For example, the first camera module 20 may be located at a left side of the second camera module 30.

In some embodiments, the first camera module 20 may be selected from the following forms of cameras: a black and white camera, an RGB camera, an infrared camera, a wide-angle camera, and a telephoto camera. The second camera module 30 may be may be selected from the following forms of cameras: a black and white camera, an RGB camera, an infrared camera, a wide-angle camera, and a telephoto camera. A form of the first camera module 20 may be the same as or different from that of the second camera module 30.

In other alternative embodiments, the second camera module 30 may be omitted. In still other alternative embodiments, the electronic device 1000 may include three or more than three camera modules.

Figure 6:
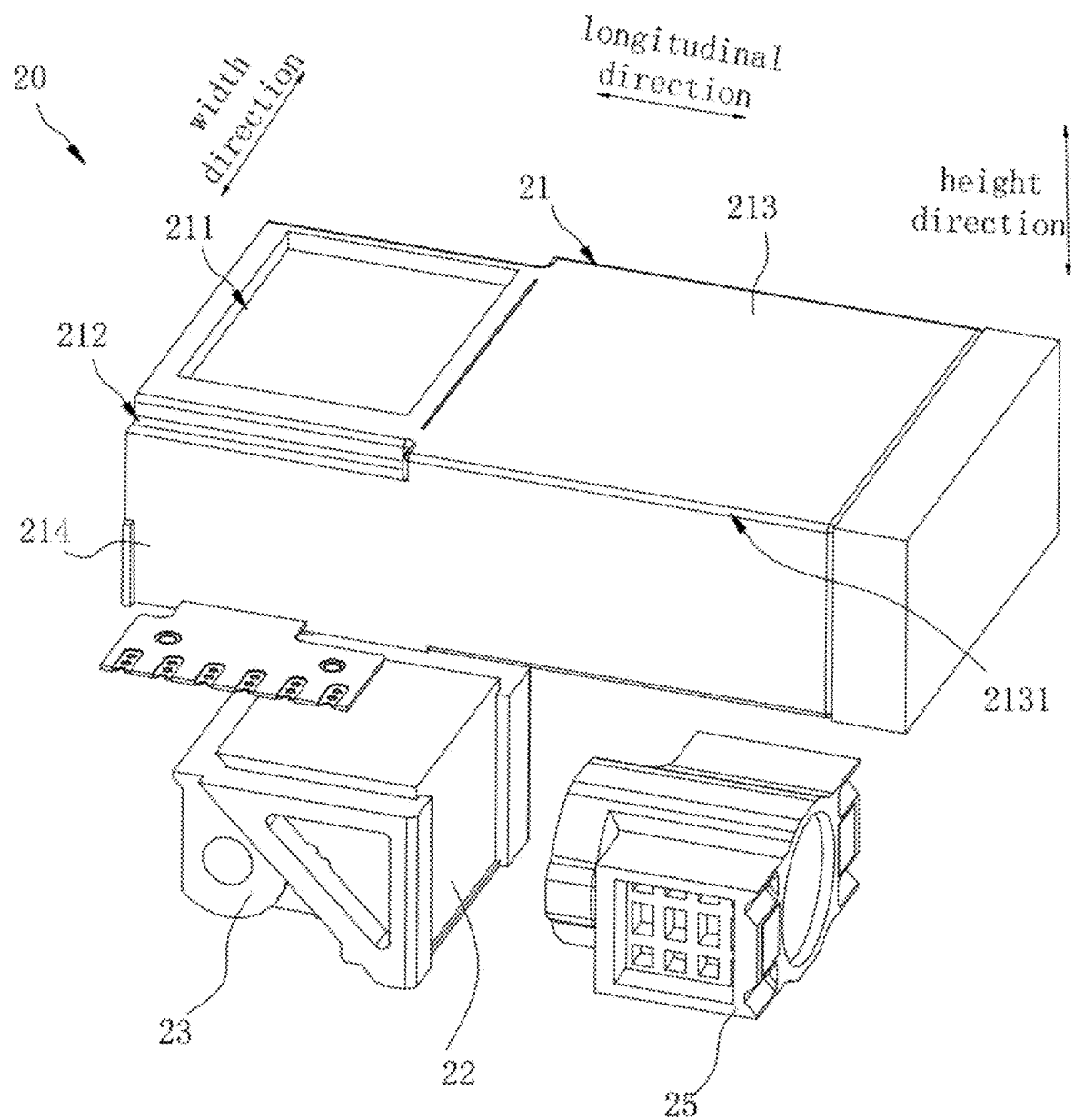
FIG. 6 illustrates an exploded perspective view of a first camera module of the camera assembly of FIG. 4.
Figure 7:
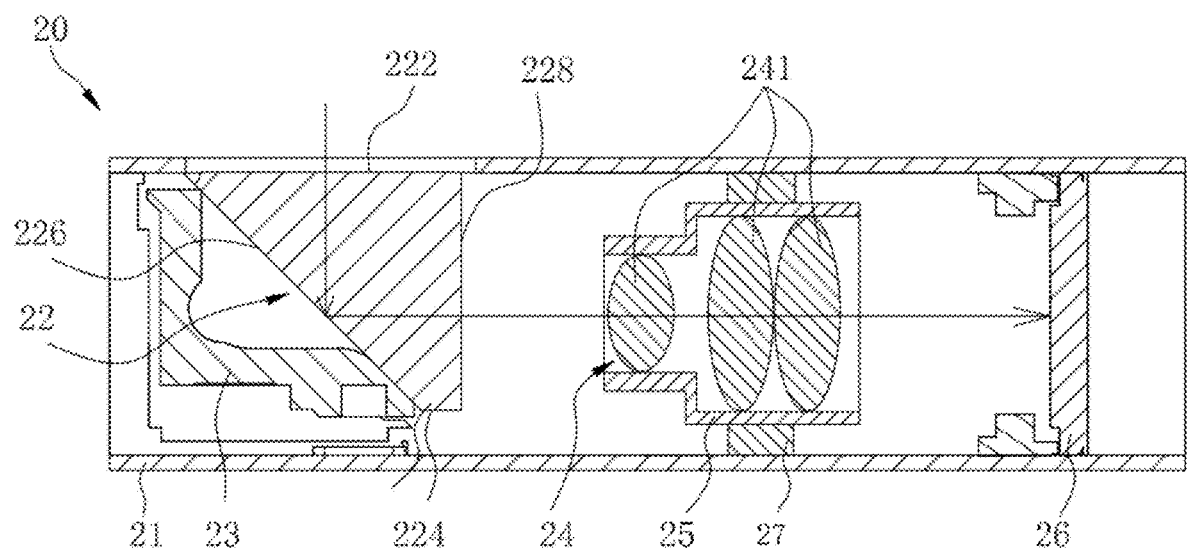
FIG. 7 illustrates a cross-sectional view of the first camera module of FIG. 4, taken along a line VII-VII.
Figure 8:
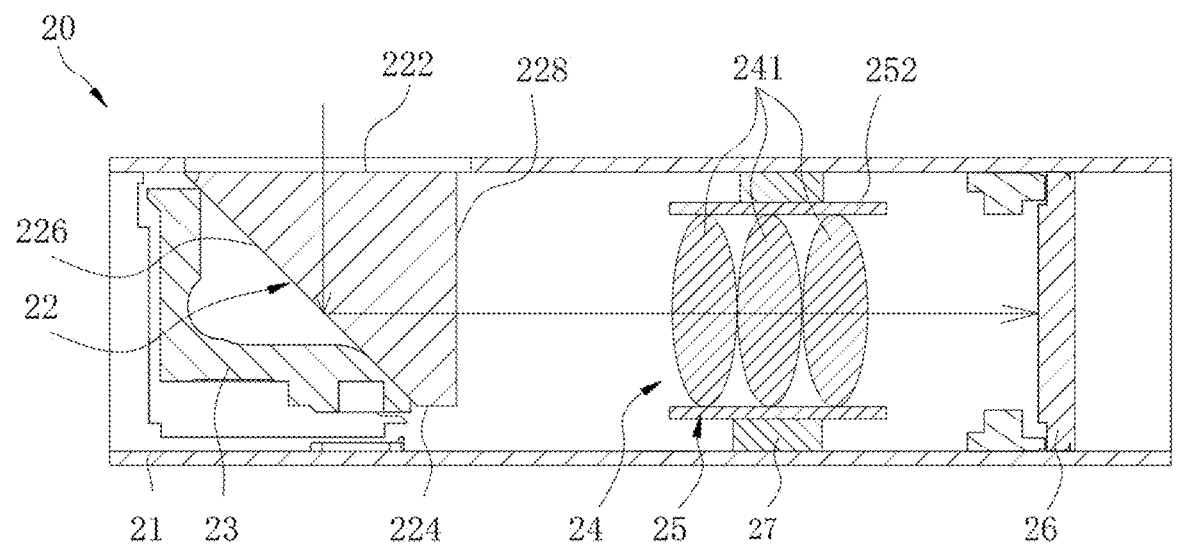
FIG. 8 illustrates a cross-sectional view of the first camera module of FIG. 4, taken along a line VII-VII, in accordance with another embodiment of the present disclosure.

As illustrated in FIGS. 6-8, in the illustrated embodiment, the first camera module 20 includes a casing 21, a prismatic reflector 22, a mounting base 23, a first lens group 24, a movable member 25, a drive member 27, and a first image sensor 26. The casing 21 is received in the support 40 adjacent to the first camera module 20. The prismatic reflector 22, the mounting base 23, the first lens group 24, the movable member 25, and the first image sensor 26 are all received in the casing 21.

The mounting base 23 is fixed to the casing 21. The prismatic reflector 22 is fixed to the mounting base 23. The drive member 27 is adjacent to the prismatic reflector 22 and coupled to the casing 21. The movable member 25 is coupled to the drive member 27 and opposite to the prismatic reflector 22. The movable member 25 is capable of moving in the casing 21 when driven by the drive member 27. The first lens group 24 is received in the movable member 25 and face the prismatic reflector 22. The first image sensor 26 is disposed at a side of the first lens group 24 away from the prismatic reflector 22. Such that the first lens group 24 is disposed between the prismatic reflector 22 and the first image sensor 26, and can be capable of focusing light from the prismatic reflector 22 to the first image sensor 26.

After an incident light enters the casing 21, it can be transmitted to the prismatic reflector 22 and thereby be deviated by the prismatic reflector 22. Then the incident light can penetrate the first lens group 24 and arrive in the first image sensor 26. Thereby the first image sensor 26 can capture an image. The drive member 27 is configured to drive the movable member 25 to move the first lens group 24. Such that a focal length of the first lens group 24 can be changed, and a zooming effect of the first camera module 20 can be achieved.

In the illustrating embodiment, the prismatic reflector 22 is configured to deviate the incident light from the light inlet 211 to the first image sensor 26. Therefore, the first camera module 20 may be a periscope lens module. Compared with a linear camera, a height of the periscope lens module is smaller, so that a thickness of the electronic device 1000 can be reduced when the periscope lens module is applied to the electronic device 1000. It can be noticed that, the linear camera refers to those lens modules whose optical axis is a straight line. In other words, in the linear camera lens, an incident light travels along a straight optical axis to an image sensor of the linear camera.

In the illustrating embodiment, the casing 21 is substantially a cuboid frame. The casing 21 faces the decorative member 10, and defines a light inlet 211 therein corresponding to the first through hole 111. The light inlet 211 is aligned with the first through hole 111 and exposed from the through holes 11 to allow external light to pass through. The incident light can enter the first camera module 20 from the light inlet 211 and the first through hole 111.

The mounting base 23 is disposed in the casing 21 and facing the light inlet 211. The mounting base 23 is configured to hold and keep the prismatic reflector 22 stable.

Figure 13:
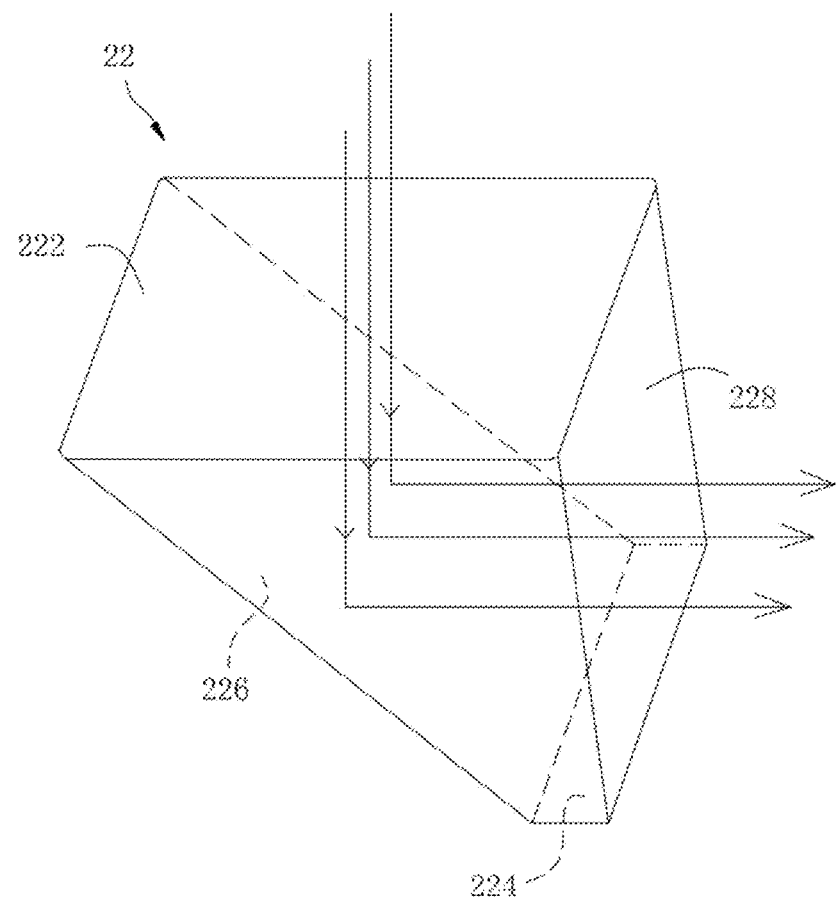
FIG. 13 illustrates a perspective view of a prismatic reflector of the camera assembly of FIG. 6.
Figure 14:
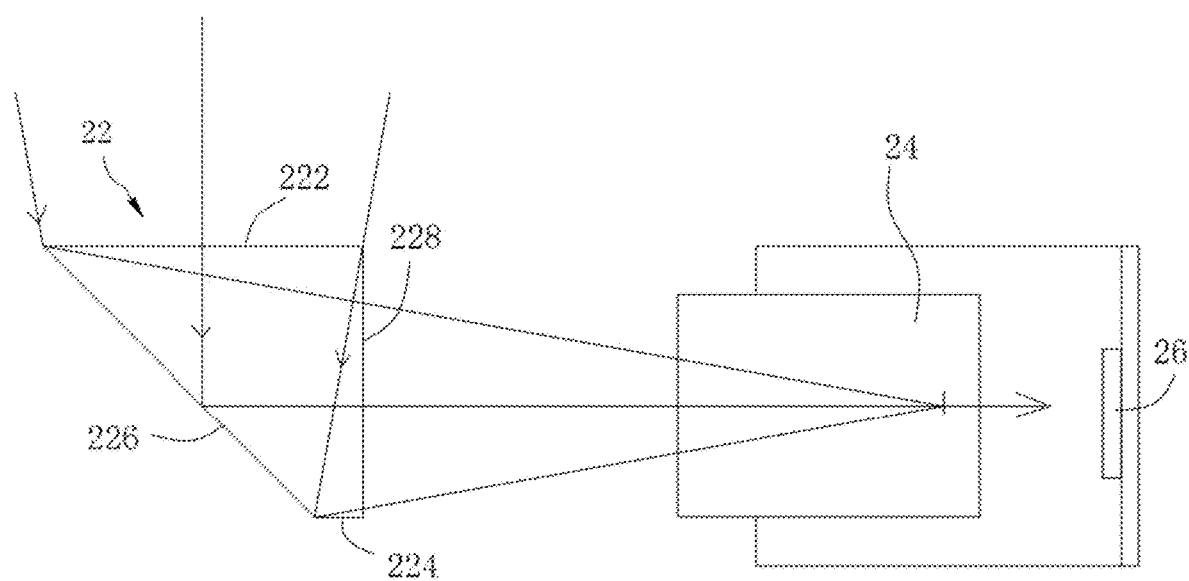
FIG. 14 illustrates a schematic view of a light reflection for imaging of the first camera module of FIG. 6.

As illustrated in FIG. 6, the prismatic reflector 22 is coupled to the mounting base 23, and aligned with the light inlet 211. As illustrated in FIGS. 13 to 14, the prismatic reflector 22 includes a light-incident surface 222, an opposite surface 224, a reflective face 226, and a light-emitting surface 228. The light-incident surface 222 is adjacent to and facing the light inlet 211. The opposite surface 224 is away from the light inlet 211 and opposite to the light-incident surface 222. The reflective face 226 is connected to the light-incident surface 222 and the opposite surface 224. The light-emitting surface 228 is connected to the light-incident surface 222 and the opposite surface 224. The reflective face 226 is disposed obliquely with respect to the light-incident surface 222. The light-emitting surface 228 is disposed opposite to the reflective face 226. The opposite surface 224 is fixed to the mounting base 23 to keep the prismatic reflector 22 stable.

The prismatic reflector 22 can be made of a transparent material, such as resin, plastic, glass, etc. The reflective face 226 is an interior face of the prismatic reflector 22. An exterior surface of the prismatic reflector 22 coincided with the reflective face 226 can be coated by a reflective material, thereby allowing the reflective face 226 to reflect the incident light. The reflective material may be silver. When light penetrates the light-incident surface 222 and enters the prismatic reflector 22, the light may strike the reflective face 226 and internal reflection therefore occurs, and the light ray is deviated.

In the illustrating embodiment, during the deviation of the incident light, the incident light penetrates the light inlet 211 and enters the prismatic reflector 22 from the light-incident surface 222. The incident light is reflected by the reflective face 226 when strikes on the reflective face 226, and finally emits from the light-emitting surface 228.

As illustrated in FIG. 14, in accordance of the embodiment of the present disclosure, compared with a triangular prism, a bottom corner of the prismatic reflector 22 which is away from the light inlet 211 is cut off. In other words, the prismatic reflector 22 is considered to be formed by cutting the bottom corner from a triangular prism. Because the bottom corner with a reflective face of a triangular prism is usually unable to reflect light or reflect a few light but occupies a certain room to disposed. When the bottom corner is omitted, a thickness of the prismatic reflector 22 can be reduced and an effectiveness of the prismatic reflector 22 for reflecting the incident light remains effective.

In some embodiments, the reflective face 226 is inclined at 45 degrees with respect to the light-incident surface 222. In this way, the incident light is effectively reflected and deviated, and has better light conversion effect.

In some embodiments, the light-incident surface 222 is parallel with the opposite surface 224. In this way, when the opposite surface 224 is fixed to the mounting base 23, the prismatic reflector 22 can be kept stable. In some embodiments, the light-incident surface 222 and the opposite surface 224 are both perpendicular to the light-emitting surface 228. Furthermore, the prismatic reflector 22 has a substantially trapezoidal cross section taken along a transmitting path of the incident light. In other words, the prismatic reflector 22 is substantially a trapezoidal frustum. Therefore, a structure of the prismatic reflector 22 is similar to a 45° right-angled prism. Such that a high light transmission efficiency is achieved. The reflective face is considered as a hypotenuse of the right-angled prism. The incident light may enter the incident surface of the prismatic reflector normally and may fall on the reflective face 226 internally at an angle of incidence of 45°. Total reflection may occur on reflective face 226, because the critical angle for ordinary glass is about 42° when the prismatic reflector 22 is made of glass. Such that a light reflection efficiency is improved.

In some embodiments, a distance between the light-incident surface 222 and the opposite surface 224 ranges from 4.8 mm to 5.0 mm.

Furthermore, the distance between the light-incident surface 222 and the opposite surface 224 may be 4.85 mm, 4.9 mm, 4.95 mm etc. In other words, the distance between the light-incident surface 222 and the opposite surface 224 can represent a height of the prismatic reflector 22, and the height of the prismatic reflector 22 is ranges from 4.8 mm to 5.0 mm. When the distance between the light-incident surface 222 and the opposite surface 224 falls into the above range, the prismatic reflector 22 can have a moderate size, and can be better integrated into the first camera module 20. Such that the first camera module 20 having a compact and miniaturized conformation can be achieved. Thereby the first camera module 20 and the electronic device 1000 can be miniaturized to meet demands of consumers.

In some embodiments, hardening treatment are applied to all of the light-incident surfaces 222, the opposite surface 224, the reflective face 226, and the light-emitting surface 228. Therefore, each of the light-incident surfaces 222, the opposite surface 224, the reflective face 226, and the light-emitting surface 228 is coated by a hardened layer.

Furthermore, the hardening treatment can be applied to all of external surfaces of the prismatic reflectors 22 to increase a strength of the prismatic reflector 22. The hardening treatment can be, such as an infiltration of lithium ions, or covering with films to the external surfaces without decreasing a transmitting efficient of the incident light.

In some embodiment, an angle between a reflection ray and an incident ray of the incident light from the light inlet 211 is about 90 degrees when the incident light is reflected by the prismatic reflector 22. For example, when the incident light strikes the reflective face of the prismatic reflector 22, an angle of incident is 45 degrees while an angle of reflection is also 45 degrees. Alternatively, the angle between the reflection light and the incident light when reflected by the prismatic reflector 22 can be other values, such as, 80 degrees, 100 degrees etc., as long as the incident light can be reflected and transmit to the first image sensor 26.

In the illustrated embodiment, one prismatic reflector 22 is provided in the first camera module 20. The incident light is reflected one time during the travel from the light inlet 211 to the first imaging sensor 26. In other alternative embodiments, a number of prismatic reflectors 22 can be more than one, and the incident light can be reflected at least twice during the travel from the light inlet to the first image sensor 26.

In some embodiments, two prismatic reflectors 22 are provided in the first camera module 20. The two prismatic reflectors 22 can include a first prismatic reflectors and a second prismatic reflectors arranged in a face-to-face manner. The first image sensor 26 can be disposed at a side of the second prismatic reflector and facing a light-emitting surface of the second prismatic reflector. The incident light may enter the first prismatic reflector and arrive in the second prismatic reflector after being reflected by the first prismatic reflector. The incident light then emits from the second prismatic reflector, a deviation of the incident light can be achieved. The first lens group 24 can be disposed on a transmitting path of the incident light. For example, the first lens group 24 can be disposed between the first prismatic reflector and the second prismatic reflector, or disposed between the second prismatic reflector and the first image sensor 26.

The mounting base 23 is a support for supporting the prismatic reflector 22. The mounting base 23 is coupled to the casing 21 and facing the light inlet 211. Such that a position of the prismatic reflector 22 can be easily limited to aligned with the light inlet 211. Thereby an efficiency of the reflection or refraction of the incident light can be ensured. The prismatic reflector 22 can be fixed to the mounting base 23 by adhesive bonding to achieve a fixed connection with the mounting base 23.

As illustrated in FIG. 7, in some embodiment, the mounting base 23 is movably received in the casing 21. The mounting base 23 is rotatable with respect to the casing 21 to adjust the position of the prismatic reflector 22. Such that a direction of the transmitting path of the incident light can be adjusted by the prismatic reflector 22.

In some embodiments, the mounting base 23 can be coupled to the drive member 27. The drive member 27 can be configured to rotate the mounting base 23. When in use, the first camera module 20 may shake because of a lability of a user. It may result a deflection to the incident light, and the first image sensor 26 may thereby capture a blurry image. When the mounting base 23 rotates, it can rotate the prismatic reflectors 22 in a direction that opposite to a shaking direction of the first camera module 20. Thereby the deflection of the incident light occurring during the motion of the first camera module 20 can be compensated. Thereby image stabilization of the first image sensor 26 can be achieved.

As illustrated in FIG. 7, in some embodiments, the movable member 25 is substantially cannular, such as a cylindrical or a lens barrel the first lens group 24 includes a plurality of lenses 241. The plurality of lenses 241 are arranged in a row and received in the movable member 25. Each one of the plurality of lenses 241 is spaced apart from an adjacent lens 241. The plurality of lenses 241 are fixed in an axial direction of the movable member 25.

As illustrated in FIG. 8, in other embodiments, the movable member 25 can include two clipping members 252. The two clipping members 252 are disposed oppositely. The plurality of lenses 241 can be disposed between the two clipping members 252.

It can be understood that, since the movable member 25 is configured to receive the plurality of lenses 241, a length of the movable member 25 is required to be large. The movable member 25 may be cylinder, cuboid, or other shapes each defining a cavity therein. Therefore, the movable member 25 can be configured to receive the plurality of lenses 241 in the cavity. The lenses 241 can be protected when positioned in the cavity, so that the lenses 241 are kept stable.

Furthermore, because the movable member 25 includes the two clipping members 252, and the plurality of lenses 241 are disposed by the two clipping members 252, a stability of the movable member 25 and the lenses 241 can be achieved, and a weight of the movable member 25 can be reduced. Therefore, a power for the drive member 27 to move the movable member 25 can be reduced. A design of the movable member 25 can be easier, and the lens 241 is also easier to be disposed in the movable member 25.

In other embodiment, a structure of the movable member 25 is not limited to the above-mentioned cylinder or the structure of the two clipping members 252. In some embodiments, the movable member 25 may include three, four or more clipping members 252 to form a more stable structure. The movable member 25 also may include only one clipping member 252. Such that a structure of the movable member 25 can be simplified. In some embodiments, the movable member 25 may have a rectangular body, or a circular body, or other forms of bodies with the cavities to accommodate the lens 241 with corresponding shapes. The structure of the movable member 25 can be designed in other manner, as long as the first camera module 20 can capture images and be operated.

Figure 9:
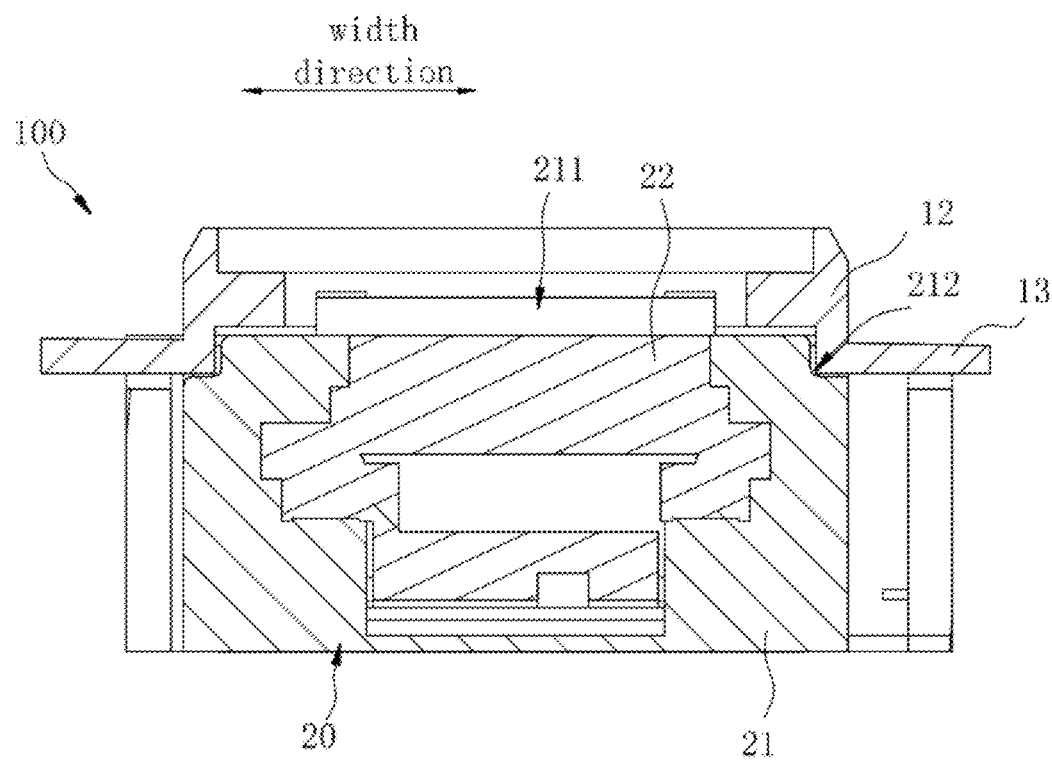
FIG. 9 illustrates a cross-sectional view of the camera assembly of FIG. 3, taken along a line IX-IX.

As illustrated in FIG. 9, in the illustrating embodiment, the casing 21 defines a notch 212 therein. The notch 212 is defined beside the light inlet 211. The light inlet 211 and the notch 212 are arranged adjacent with each other along a width direction of the first camera module 20. The decorative member 10 is partially engaged in the notch 212 when the decorative member 10 is mounted on the casing 21.

Figure 11:
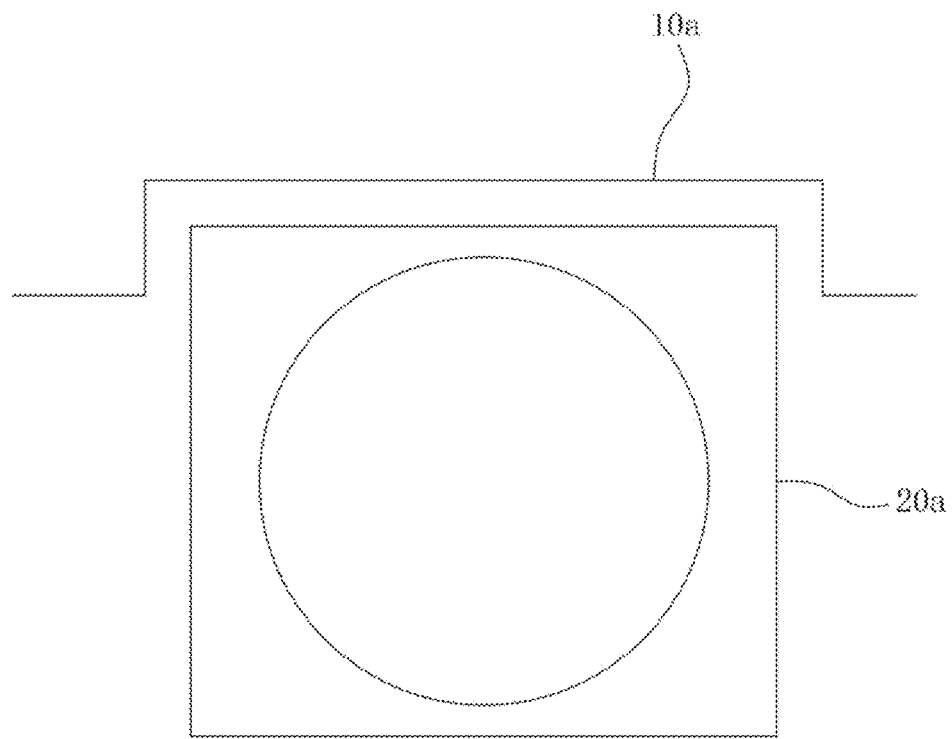
FIG. 11 illustrates a schematic projection view of an engaging structure of the decorative member and the camera module of the camera assembly of FIG. 3, in accordance with some embodiment of the present disclosure.

As illustrated in FIG. 11, when the notch 212 is omitted, in order to reduce a thickness of the electronic device, the decorative member 10a can define a receiving portion in a width direction thereof. A portion of the first camera module 20a can be engaged into the receiving portion.

As illustrated in FIG. 6, FIG. 9, in the illustrating embodiment, two notches 212 are defined in the casing 21. The notches 212 are respectively defined at opposite sides of the casing 21. The decorative bezel 12 of the decorative member 10 is stacked on a top of the casing 21. The support portion 13 of the decorative member 10 is partially engaged in the notches 212. Such that a width of a connection structure formed by the decorative member 10 and the casing 21 can be reduced, and an overall height of the camera assembly 100 can be reduced. Therefore, a compactness and a miniaturization of the camera assembly 100 can be achieved.

Furthermore, the casing 21 includes a top wall 213 and two side walls 214. The top wall 213 includes two edges 2131. The two edges 2131 are disposed oppositely. One of the side walls 214 is coupled to and extends from one corresponding edge 2131. In other words, the two side walls 214 are respectively coupled to the two opposite edges 2131 of the top wall 213. The light inlet 211 is defined between the two edges 2131, and each one of the notches 212 is defined in one of the edges 2131. By this way, the notch 212 is easily defined, which can facilitate the manufacture of the casing 21. In some embodiments, the notch 212 is a stamping profile of the casing 21, for example, the notch 212 can be defined in the casing 21 by stamping.

In some embodiments, the decorative member 10 abuts against the top wall 213. A bottom portion of the decorative bezel 12 is received in the notch 212, and the decorative bezel 12 is partially abutted against the top wall 213. Therefore, the decorative bezel 12 and the casing 21 cooperatively form an embedding structure. Thereby the decorative bezel 12 and the casing 21 are fitted with each other to make a fitting structure of the decorative member 10 and the casing 21 more compact.

In the illustrating embodiment, two notches 212 are defined in the top wall 213. Alternatively, in other embodiments, the number of the notches 212 may also be one or more, in other words, just one notch 212 is defined in the top wall 213 or more than two notches 212 are defined in the top wall 213.

In the illustrating embodiment, the notch 212 is stripshaped. The notch 212 can extend along a longitudinal direction of the first camera module 20. By this way, the decorative member 10 can be engaged with the notch 221 more tightly. In some embodiments, the notch 212 can be curved, and the curved notch 212 can surround the light inlet 211. Alternatively, in other embodiments, a structure and shape of the notch 212 are not limited to the above examples, as long as the decorative member 10 and the first camera module 20 can form an embedding structure to reduce the size of the embedding structure.

In the illustrating embodiment, the first lens group 24 is received in the movable member 25. Furthermore, the first lens group 24 is disposed between the prismatic reflector 22 and the first image sensor 26. The first lens group 24 is configured to focus the incident light to form an image on the first image sensor 26. Such that the first image sensor 26 can capture a quality image.

The first image sensor 26 may be a photosensitive element such as a Complementary Metal Oxide Semiconductor (CMOS) or a Charge-coupled Device (CCD).

In the illustrating embodiment, the first lens group 24 can focus the incident light and form an image on the first image sensor 26 when moves along an optical axis thereof. Thereby enabling the first camera module 20 to zoom and focus. The first lens group 24 includes a plurality of lenses 241. When at least one of the lens 241 moves, a focal length of the first lens group 24 can be changed. Thereby a zooming function of the first camera module 20 can be achieved. Furthermore, the first lens group 24 can be moved by the movable member 25 for zooming function, and the movable member 25 is driven by the drive member 27 to move in the casing 21. In some embodiment, the movable member 25 can be a lens barrel, and the drive member 27 may be a zooming ring. The drive member 27 is coupled to the movable member 25. When the drive member rotates, the movable member 25 and the first lens group 24 is moved along the optical direction of the lenses 241. In other embodiments, the drive member 27 may be a linear driving mechanism such as a linear motor or a voice coil actuator.

In some embodiments, the drive member 27 can be an electromagnetic driving mechanism, a piezoelectric driving mechanism, or a memory alloy driving mechanism.

Furthermore, in some embodiment, the electromagnetic driving mechanism can generate a magnetic field and can include a conductor. When the magnetic field moves with respect to the conductor, an induced current is generated in the conductor. The induced current causes an Amperage force to apply on the conductor, and the Amperage force forces the conductor to move. In the illustrating embodiment, the conductor may be a portion of the electromagnetic driving mechanism that drives movable member 25.

In some embodiment, the piezoelectric drive mechanism is working based on an inverse piezoelectric effect of a piezoelectric ceramic material. When a voltage is applied to a piezoelectric material, mechanical stress can be generated. In other words, a conversion occurs between an electrical energy and a mechanical energy. By controlling a mechanical deformation of the piezoelectric material, a rotational or linear motion can be achieved. Such that the piezoelectric drive mechanism can have advantages of simple structure and low speed.

In some embodiment, the memory alloy driving mechanism is working base d on the characteristics of a shape-memory alloy. A shape-memory alloy is a special alloy that can be deformed when cold but returns to its pre-deformed ("remembered") shape when heated. Thereby a motion caused by the memory alloy can be occurs when the memory alloy deforms or returns to its pre-deformed. The motion caused by memory alloy driving mechanism can have the advantages of rapid displacement and free direction.

Figure 10:
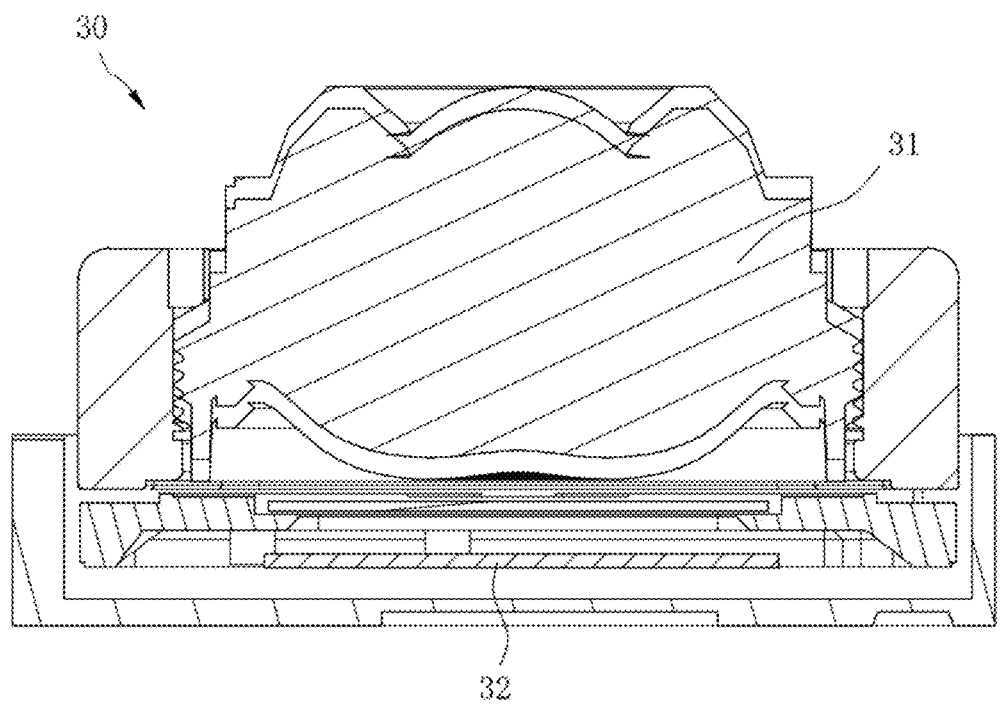
FIG. 10 illustrates a cross-sectional view of a second camera module of the camera assembly of FIG. 4, taken along a line X-X.

As illustrated in FIG. 10, in the illustrating embodiment, the second camera module 30 is a linear camera. Alternatively, in other embodiments, the second camera module 30 can also be a periscope lens module similar to the first camera module 20. The second camera module 30 includes a second lens group 31 and a second image sensor 32. The second lens group 31 is configured to focus light to form an image on the second image sensor 32. An incident optical axis of the second camera module 30 is coincided with an optical axis of the second lens group 31.

In the illustrating embodiment, the second camera module 30 is a fixed-focus lens module. Therefore, the second lens group 31 has fewer lenses 241 compared with a regular zoom lens module. So that a height of the second camera module 30 can be small, and a thickness of the electronic device 1000 can be reduced.

The second image sensor 32 may be the same as the first image sensor 26, and details are not repeated herein.

In summary, in accordance with an embodiment of the present disclosure, the camera assembly 100 includes a first camera module 20 and a second camera module 30. The first camera module 20 includes a casing 21, a prismatic reflector 22, and a first image sensor 26.

The casing 21 defines a light inlet 211. The prismatic reflector 22 is configured to change a travel direction of the incident light from the light inlet 211; thereby the incident light can arrive in the first image sensor 26. Such that the first image sensor 26 can received light from outside the first camera module 20. The prismatic reflector 22 includes a light-incident surface 222 that is adjacent to and facing the light inlet 211, an opposite surface 224 that is away from the light inlet 211 and opposite to the light-incident surface 222, a reflective face 226 that is connected to the light-incident surface 222 and the reflective face 226, and a light-emitting surface 228 connected to the light-incident surface 222 and the opposite surface 224. The light-emitting surface 228 is disposed oppositely to the light-incident surface 222. In the above-described camera assembly 100 and the electronic device 1000, compared with a regular triangular prism having a triangular cross section, a corner of the prismatic reflector 22 away from the light inlet 211 is cut off. Because the bottom corner with a reflective face of a triangular prism is usually unable to reflect light or reflect a few light but occupies a certain room to disposed. When the bottom corner is omitted, the height of the prismatic reflector 22 is smaller than the regular triangular prism. So that the camera assembly 100 having a compact and miniaturized conformation can be achieved.

As used herein, a "communication terminal" (or simply a "terminal") includes, but is not limited to, a device that is configured to receive/transmit communication signals via a wireline connection, such as via a public-switched telephone network (PSTN), digital subscriber line (DSL), digital cable, a direct cable connection, and/or another data connection/network, and/or via a wireless interface with, for example, a cellular network, a wireless local area network (WLAN)1 a digital television network such as a DVB-H network, a satellite network, an AM/FM broadcast transmitter, and/or another communication terminal. A communication terminal that is configured to communicate over a wireless interface may be referred to as a "wireless communication terminal," a "wireless terminal" and/or a "mobile terminal." Examples of mobile terminals include, but are not limited to, a satellite or cellular radiotelephone; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radio-telephone transceiver.

In the description of the present specification, the description with reference to the terms "one embodiment", "some embodiments", "illustrative embodiment", "example", "specific example", or "some examples", etc., serves for description of structures, materials or characteristics described in the embodiments or examples that are included in at least one embodiment or example of the present disclosure. In the present specification, the schematic representation of the above terms does not necessarily mean the same embodiment or example. Furthermore, the particular features, structures, materials, or characteristics described may be combined in a suitable manner in any one or more embodiments or examples.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A camera assembly, comprising:
a support;
a decorative member, defining a through hole therein; and
a camera module, disposed in the support and coupled to the decorative member; the camera module comprising:
a casing, defining a notch and a light inlet; wherein the casing comprising a top wall and a side wall, the top wall comprises an edge, the side wall extends from the edge of the top wall, the notch is defined in the top wall along the edge, the decorative member is disposed on the casing, and the light inlet is aligned with the through hole;
a prismatic reflector, disposed in the casing and aligned with the light inlet; and an image sensor, disposed in the casing; the prismatic reflector being configured to reflect an incident light from the light inlet to the image sensor, thereby the image sensor being capable of capturing images; wherein the prismatic reflector comprises:
   a light-incident surface, facing the light inlet;
   an opposite surface, being opposite to the light-incident surface;
   a reflective face, coupled to the light-incident surface and the opposite surface; wherein the reflective face is inclined with respect to the light-incident surface; and
   a light-emitting surface, coupled to the light-incident surface and the opposite surface; wherein the light-emitting surface is opposite to the reflective face;
wherein the decorative member comprises a decorative bezel and a support portion, the decorative bezel is disposed on a side of the support portion away from the camera module, a bottom portion of the decorative bezel is received in the notch, the decorative bezel is partially abutted against the top wall;
wherein the support portion extends, in a direction away from the notch, from the bottom of the decorative bezel and beyond the side wall, and the support portion abuts against the support.

2. The camera assembly of claim 1, wherein the light inlet is defined in the top wall.

3. The camera assembly of claim 1, wherein the light-incident surface is parallel to the opposite surface.

4. The camera assembly of claim 3, wherein the light-incident surface and the opposite surface are both perpendicular to the light-emitting surface; the reflective face is inclined at 45 degrees with respect to the light-incident surface.

5. The camera assembly of claim 1, wherein the camera module further comprises:
   a drive member, disposed in the casing; and
   a mounting base disposed in the casing and coupled to the drive member; the prismatic reflector is coupled to the mounting base; when driven by the drive member, the mounting base is capable of rotating to rotate the prismatic reflector.

6. The camera assembly of claim 1, wherein the camera module further comprises:
   a movable member, disposed between the prismatic reflector and the image sensor;
   a plurality of lenses, coupled to the movable member; and
   a drive member coupled to the movable member; the drive member is configured to move the movable member along a direction of an optical axis of the plurality of lenses.

7. The camera assembly of claim 6, wherein the plurality of lenses are arranged along the optical axis and spaced apart with each other.

8. The camera assembly of claim 6, wherein the movable member comprises two clipping members; the two clipping members are disposed in the casing oppositely; the plurality of lenses are disposed between the two clipping members.

9. The camera assembly of claim 1, wherein a distance between the light-incident surface and the opposite surface ranges from 4.8 mm to 5.0 mm.

10. The camera assembly of claim 1, wherein each of the light-incident surface, the opposite surface, the reflective face, and the light-emitting surface is coated by a hardened layer.

11. An electronic device, comprising:
   a housing, comprising a rear cover, the rear cover defining a mounting hole; and
   a camera assembly comprising a decorative member, a camera module and a support disposed in the housing, the camera module being disposed in the support, the decorative member being disposed on the camera module, the camera module comprising:
      a casing, defining a light inlet, the light inlet aligning with the mounting hole;
      a prismatic reflector, disposed in the casing and aligned with the light inlet; and
      an image sensor, disposed in the casing; the prismatic reflector being configured to reflect an incident light from the light inlet to the image sensor; wherein the prismatic reflector comprises:
         a light-incident surface, facing the light inlet;
         an opposite surface, disposed oppositely to the light-incident surface;
         a reflective face, coupled to the light-incident surface and the opposite surface; wherein the reflective face is inclined with respect to the light-incident surface; and
         a light-emitting surface, coupled to the light-incident surface and the opposite surface; wherein the light-emitting surface is opposite to the reflective face;
   wherein the decorative member comprises a decorative bezel and a support portion, the decorative bezel is disposed on a side of the support portion away from the camera module, the decorative bezel is inserted into the mounting hole and protrudes outwardly from the rear cover, the support portion extends outwardly away from the decorative bezel and beyond the support, and the support portion abuts against the support and an interior surface of the rear cover.

12. The electronic device of claim 11, wherein the casing defines a notch beside the light inlet, a bottom portion of the decorative bezel is received in the notch.

13. The electronic device of claim 12, wherein the casing comprises a top wall and a side wall, the top wall comprises an edge, the side wall is coupled to the edge of the top wall, the casing defines a notch along the edge of the top wall, and a bottom portion of the decorative bezel is received in the notch.

14. The electronic device of claim 11, wherein the casing comprises a top wall and two side walls, the top wall comprises two opposite edges, each of the two side walls is coupled to and extends from one corresponding edge of the top wall, the casing defines two notches along the two edges respectively, and a bottom portion of the decorative bezel is received in the notches.

15. The electronic device of claim 11, wherein the light-incident surface is parallel to the opposite surface, the light-incident surface and the opposite surface are both perpendicular to the light-emitting surface.

16. The electronic device of claim 11, wherein a distance between the light-incident surface and the opposite surface ranges from 4.8 mm to 5.0 mm.

17. The electronic device of claim 11, wherein each of the light-incident surface, the opposite surface, the reflective face, and the light-emitting surface is coated by a hardened layer.

18. The electronic device of claim 11, wherein the reflective face is inclined at 45 degrees with respect to the light-incident surface.

19. The electronic device of claim 11, wherein the camera module further comprises:

a drive member, disposed in the casing; and a mounting base disposed in the casing and coupled to the drive member; the prismatic reflector is coupled to the mounting base; when driven by the drive member, the mounting base is configured to rotate the prismatic reflector.

20. An electronic device, comprising:

a housing, comprising a rear cover, the rear cover defining a mounting hole; and a camera assembly comprising a decorative member, a camera module and a support disposed in the housing, the camera module disposed in the support, the decorative member being disposed on the camera module, the camera module comprising:

a casing, defining a notch and a light inlet, wherein the light inlet aligns with the mounting hole, the casing comprising a top wall and a side wall, the top wall comprises an edge, the side wall extends from the edge of the top wall, the notch is defined in the top wall along the edge;

a prismatic reflector, disposed in the casing and aligned with the light inlet; and an image sensor, disposed in the casing; the prismatic reflector being configured to reflect an incident light from the light inlet to the image sensor; wherein the prismatic reflector comprises:

a light-incident surface, facing the light inlet;

an opposite surface, disposed oppositely to the light-incident surface;

a reflective face, coupled to the light-incident surface and the opposite surface; wherein the reflective face is inclined with respect to the light-incident surface; and a light-emitting surface, coupled to the light-incident surface and the opposite surface; wherein the light-emitting surface is opposite to the reflective face;

wherein the decorative member comprises a decorative bezel and a support portion, the decorative bezel is disposed on a side of the support portion away from the camera module, a bottom portion of the decorative bezel is received in the notch, the decorative bezel is inserted into the mounting hole and protrudes outwardly from the rear cover, the decorative bezel is partially abutted against the top wall, the support portion extends outwardly away from the decorative bezel and beyond the support, and the support portion abuts against the support and an interior surface of the rear cover.

* * * * *